US008280131B2

(12) United States Patent
Kempe et al.

(10) Patent No.: US 8,280,131 B2
(45) Date of Patent: Oct. 2, 2012

(54) METHOD AND CONFIGURATION FOR OPTICALLY DETECTING AN ILLUMINATED SPECIMEN

(75) Inventors: Michael Kempe, Jena (DE); Ralf Wolleschensky, Jena (DE)

(73) Assignee: Carl Zeiss Micro Imaging GmbH, Jena (DE)

( * ) Notice: Subject to any disclaimer, the term of this patent is extended or adjusted under 35 U.S.C. 154(b) by 869 days.

(21) Appl. No.: 12/323,123

(22) Filed: Nov. 25, 2008

(65) Prior Publication Data
US 2009/0161208 A1 Jun. 25, 2009

Related U.S. Application Data

(60) Provisional application No. 60/990,018, filed on Nov. 26, 2007.

(51) Int. Cl.
G06K 9/00 (2006.01)
G01J 1/42 (2006.01)
G02B 21/00 (2006.01)
(52) U.S. Cl. .................. 382/128; 356/227; 359/368
(58) Field of Classification Search .............. 382/128; 356/227; 359/368
See application file for complete search history.

(56) References Cited

U.S. PATENT DOCUMENTS

| 6,028,306 A | | 2/2000 | Hayashi | |
|---|---|---|---|---|
| 6,744,572 B1 | * | 6/2004 | McCormick | 359/799 |
| 6,819,468 B2 | * | 11/2004 | Dho | 359/279 |
| 6,917,696 B2 | * | 7/2005 | Soenksen | 382/128 |
| 7,274,446 B2 | * | 9/2007 | Wolleschensky et al. | 356/300 |
| 2003/0132394 A1 | * | 7/2003 | Wolleschensky et al. | 250/458.1 |
| 2004/0031930 A1 | * | 2/2004 | Wolleschensky et al. | 250/458.1 |
| 2004/0095576 A1 | * | 5/2004 | Wolleschensky | 356/317 |
| 2004/0113059 A1 | * | 6/2004 | Kawano et al. | 250/234 |
| 2004/0174593 A1 | * | 9/2004 | Weyh et al. | 359/388 |
| 2005/0073742 A1 | * | 4/2005 | Weyh et al. | 359/385 |

FOREIGN PATENT DOCUMENTS

DE 10257237 A1 6/2003

OTHER PUBLICATIONS

"Method of obtaining optical sectioning by using structured light in a conventional microscope", M. A. A. Neil et al., Optics Letters, vol. 22, No. 24, Dec. 15, 1997, pp. 1905-1907.*

* cited by examiner

*Primary Examiner* — Wenpeng Chen
(74) *Attorney, Agent, or Firm* — Duane Morris LLP (57) ABSTRACT

A configuration for the optical detection of a specimen, wherein the specimen or at least part of the specimen is scanned by means of linear illumination by scanning means, means for linear beam shaping of the illuminating light are provided, and the illuminating light has a preferably periodic structure in at least one spatial direction in that means for generating the structure are disposed in the illuminating beam path, light coming from the specimen is detected and images of the specimen are generated therefrom, at least one optical sectional image through the specimen and/or one image with increased resolution is/are calculated from the images, and means for generating the structure are disposed downstream of the scanning means in the direction of the illumination.

34 Claims, 10 Drawing Sheets

Key:  1    a) Direction of the structure 1
       2    b) Direction of the structure 2
       3    c) Direction of the structure 3
       4    Line
       5    Image field
       6    Scan
       7    Structure
       8    Pupil
       9    Light distribution

Figure 4

Key: 1 Grating rotation: 0 degrees
 2 45 degrees

Figure 4a

Key:  1   Contrast
      2   Non-confocal
      3   Partially confocal

Figure 5

Key:   1   AOM on
       2   AOM off
       3   Image 1
       4   Image 2

Figure 6

Key:  1    Illuminating beam path
      2    Observation beam path

Key: 1 a) Direction of the structure 1
2 b) Direction of the structure 2
3 c) Direction of the structure 3
4 Line
5 Image field
6 Scan

Figure 9

Key: 1  Illuminating beam path
     2  Observation beam path

METHOD AND CONFIGURATION FOR OPTICALLY DETECTING AN ILLUMINATED SPECIMEN

CROSS REFERENCE

This application claims the benefit of U.S. provisional patent application 60/990,018 filed on Nov. 26, 2007, the contents of which are hereby incorporated by reference herein.

FIELD OF THE INVENTION

The present invention relates to a line-scanning microscope with spatially resolved detection of the entire image field.

BACKGROUND OF THE INVENTION

It has been an objective of those within the field of the invention to enhance resolution and contrast. The use of structure illumination to achieve such objectives has been an area of investigation and development. However, the prior art has been deficient in providing a simplified configuration for the use of structured illumination, particularly in a line scanning application. Compared to the prior art, the proposed configuration has been simplified and can offer advantages in the field.

SUMMARY OF THE INVENTION

In accordance with the invention, a configuration, such as may be found in a scanning microscope, is provided for the optical detection of a specimen, in which the specimen or at least part of the specimen is scanned by means of linear illumination by a scanning means. Means are also provided for linear beam shaping of the illuminating light, and the illuminating light preferably has a periodic structure in at least one spatial direction. Means for generating the structure are disposed in the illuminating beam path. Light coming from the specimen is detected and images of the specimen are generated from the detected light. At least one optical sectional image through the specimen and/or one image with increased resolution is/are calculated from the images. Means are further provided for generating the structure in the direction of the illumination disposed downstream of the scanning means.

BRIEF DESCRIPTION OF THE DRAWINGS

FIG. 4(*a*) shows the contrast in the structured illumination in the specimen plane as a function of the rotation of the grating.

FIGS. 8(*a*), (*b*) and (*c*) illustrate light distributions, and

DESCRIPTION OF EMBODIMENTS OF THE INVENTION

Figure 1:
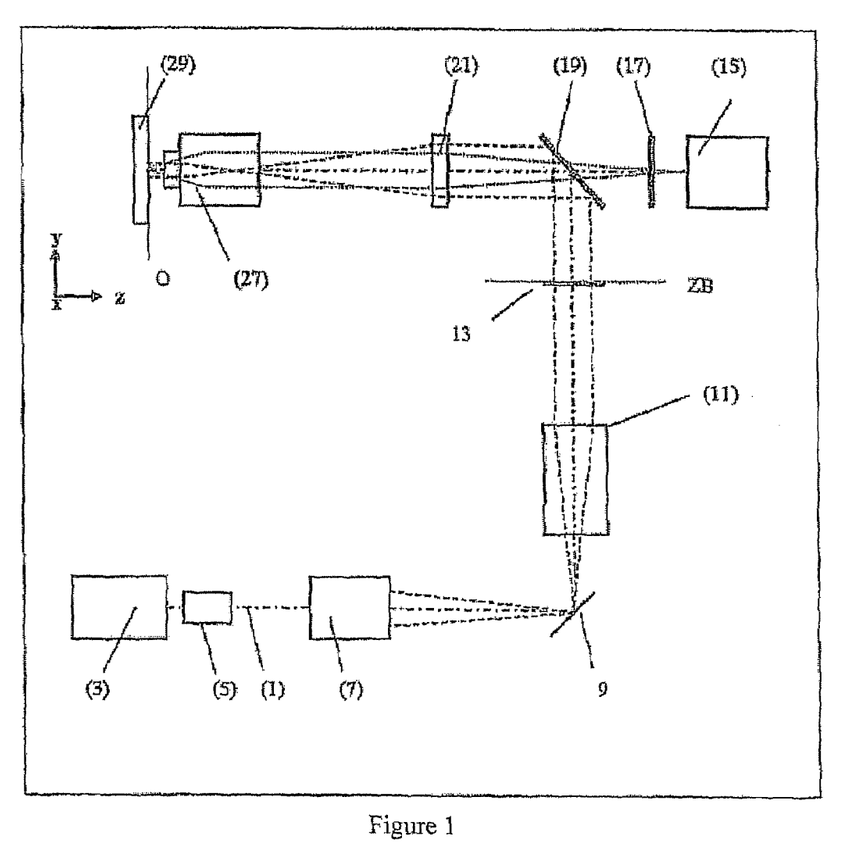
FIG. 1 is a schematic assembly of an embodiment of a microscope according to the present invention.

FIG. 1 schematically shows the assembly of an embodiment of a microscope according to the present invention which includes: an optical axis (1), a light source (3), a switchable attenuator/AOM (i.e., accusto-optical modulator) (5), a line shaping optical system (7), a scanner (9) with a rotational axis perpendicular to the drawing plane (9), a scanning optics system (11), mask (13) with a periodic structure in the intermediate image plane conjugate to the specimen with means for a translation perpendicular to the drawing plane and the rotation about the optical axis, a spatially resolved area sensor (15), e.g., a CCD, an emission filter (17), a main dichroic beam splitter (19), a barrel lens (21), a microscope objective lens (27), and specimen (29).

Located in the detection beam path in the direction of the light that is coming from the specimen (29) are an objective lens (27) that is corrected for an infinity beam path, a barrel lens (21), a main dichroic beam splitter (19) for splitting the illuminating beam and the detection beam path, an emission filter (17) and a camera (15), preferably a CCD camera. Located in the excitation beam path of the light source (3) is a beam shaping unit (7). This unit shapes the light beam of the light source (3) that has been intensity-modulated by a modulator (5), for example, an accusto-optical modulator ("AOM") or accusto-optical tunable filter ("AOTF"), for intensity control and/or wavelength selection, into a line. By means of a periodic structure, which is preferably a phase grating in or near the intermediate image plane ZB and which is preferably rotatable and, to shift the phase, can be shifted perpendicular to the optical axis, the line is structured in the specimen plane O. By means of a scanner (9), which is located downstream of the beam shaping unit but upstream of the periodic structure, the linear light distribution in the intermediate image plane ZB and in the specimen plane O is scanned perpendicular to the line expansion. The line is expanded in the specimen plane in the direction marked by an x in FIG. 1. The scanning optics system (11) projects the image of the line onto the periodic structure, with the scanner (9) being located in or near the conjugate pupil plane of the objective lens (27).

As an alternative, the structure (13) can also be an electronically controllable element, e.g., an LCD, instead of a grating with means for rotation and translation. Due to the efficiency of such elements which is typically considerably higher in a reflective configuration, the use of such an element may require that the excitation beam path be reshaped, as schematically shown in FIG. 2.

Figure 2:
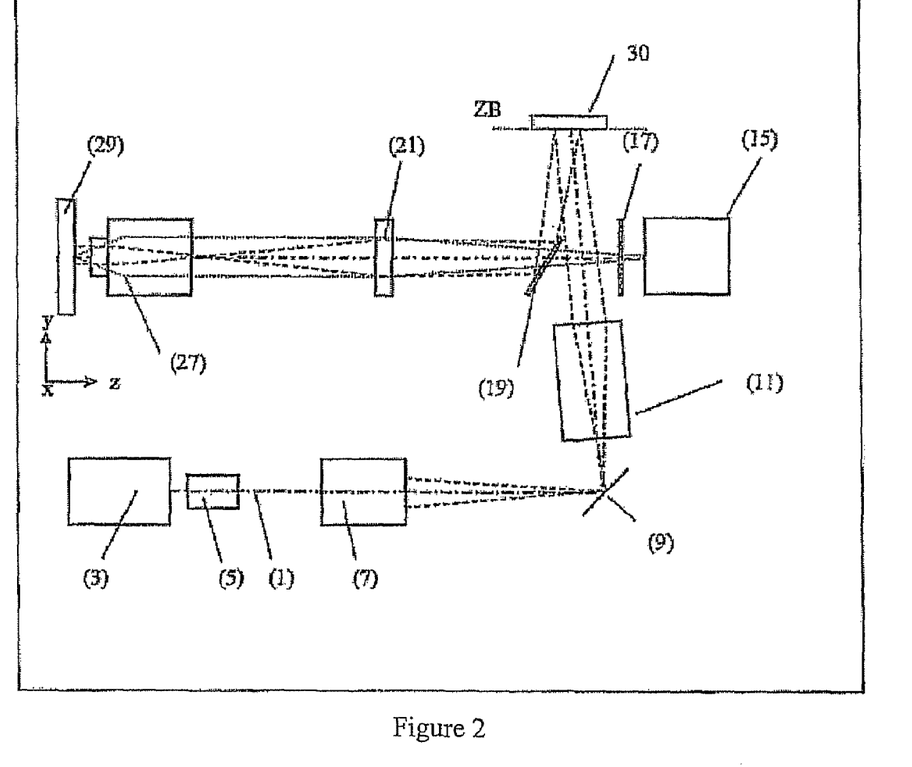
FIG. 2 is a schematic assembly of another embodiment of a microscope according to the present invention.

FIG. 2 shows the schematic assembly of the microscope with a reflective element for structuring where (1) is the optical axial, (3) is the light source, (5) is a switchable attenuator/optical modulator, (7) is the line shaping optical system, (9) is the scanner with the rotational axis perpendicular to the drawing plane, (11) is the scanning objective lens, (15) is a spatially resolved area sensor, e.g., CCD, (17) is an emission filter, (19) is the main dichroic beam splitter, (21) is the barrel lens, (27) is the microscope objective lens, (29) is the specimen, and (30) is a reflective element (see also additional examples below) for structuring in an intermediate image plane.

The configurations described have the special advantage that it is necessary to move or modify only the structures of the elements (13) in FIG. 1 and (30) in FIG. 2 in order to change the phase and direction of the structured illumination in the specimen. The direction of the line and the scanning direction on the specimen and on the detector remain unchanged. As a result, it is easier both to control the system and to analyze the images, in particular if a virtual slit aperture function is used (see description in connection with FIG. 5). At the same time, potential sources of error are eliminated since the structure of the illumination in the specimen depends solely on the position of the structure of element (13) or (30) relative to the specimen (29).

Figure 3:
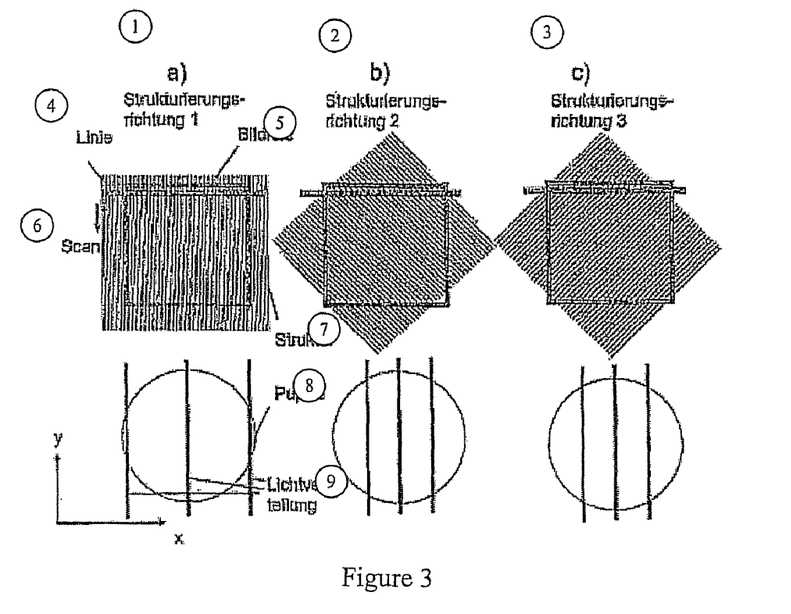
FIG. 3 illustrates the structure of the illumination in the image plane (top) and the pupil plane (bottom).

The relative orientation of structure, image field, line and scanning direction is schematically illustrated in FIGS. 3 (a)-(c). By way of an example, the structure (13) in FIG. 3(b) and FIG. 3 (c) is rotated by 45 degrees clockwise and counterclockwise, respectively.

In the lower part of the figure, the diffraction pattern that forms in the pupil is shown (for the "frozen" snapshot of the scan line in a random line position).

FIG. 3 shows the structure of the illumination in the image plane (top) and the pupil plane (bottom).

Figure 5:
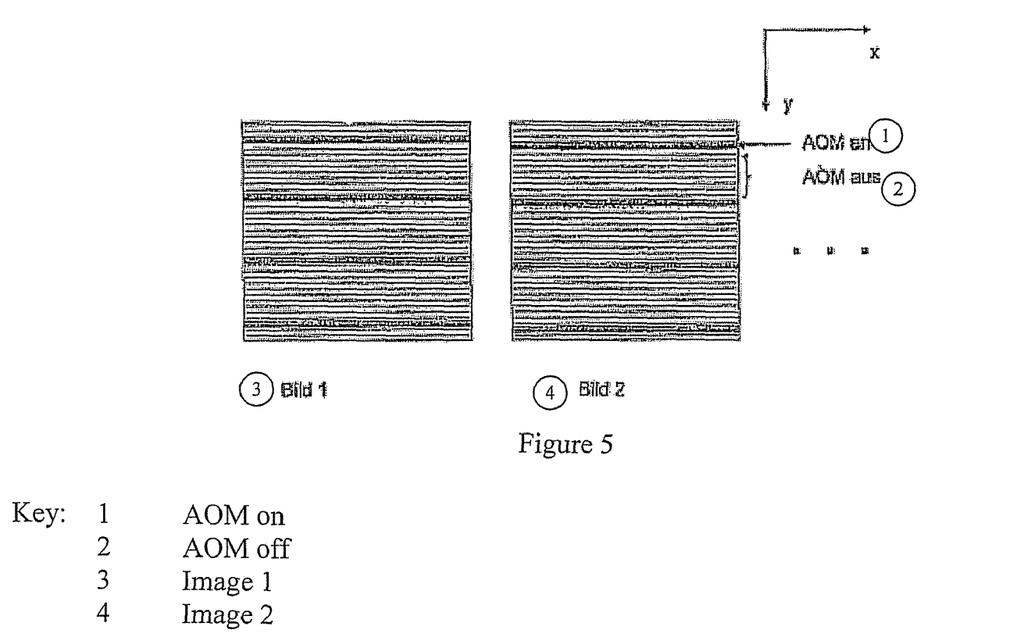
FIG. 5 illustrates an exposure pattern on a camera for confocal detection.

It is possible to combine the configurations described above with the various methods of implementing a virtual slit aperture to achieve variable, partially confocal detection, as described in FIG. 5, and such combinations are in fact preferred solutions. This also includes the option of adding an additional element upstream of the camera (15) to deflect the detected line distributions in temporal synchronicity with the scanning procedure. A peculiarity results when the line is structured near the threshold frequency, such as when the illumination is structured in order to increase the resolution. In this case, the period of the structures and the line width have a similar value at the site of the structure in or near the intermediate image. This situation is schematically illustrated in FIG. 3.

Figure 4:
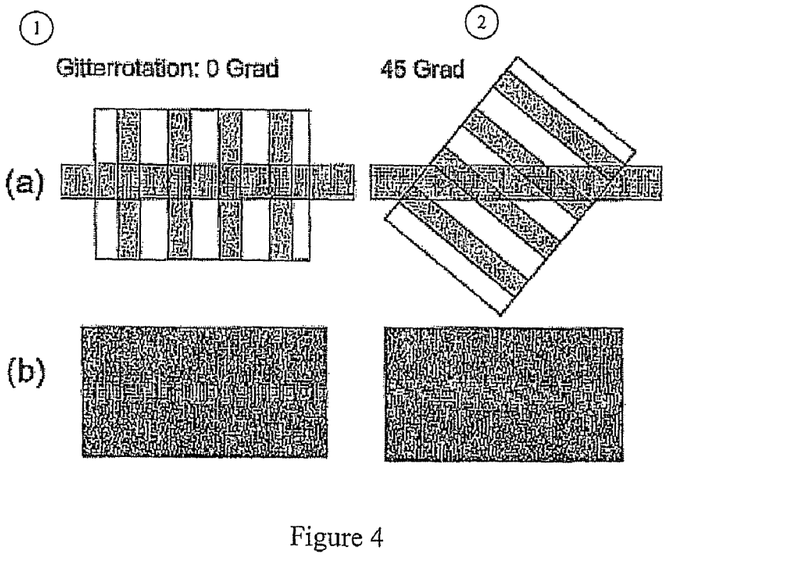
FIG. 4 shows the overlap of the line and the structure in the intermediate image plane (a) and the resulting structured line in the specimen plane (b) for two orientations of the grating.

FIG. 4 shows the overlap of the line and the structure in the intermediate image plane (a) and the resulting structured line in the specimen plane (b) for two orientations of the grating.

As a result, in contrast to diffraction-limited imaging which takes place on perpendicular orientation of the line and periodic structures, the line in the specimen plane widens. In addition, when scanning the line over the structure, the contrast of the structure in the specimen plane is decreased as the rotation increases. While the widening of the line is normally not a serious problem, the loss of contrast is undesirable in certain applications. This loss of contrast can, however, be considerably reduced by using partially confocal detection, as described in connection with FIG. 5, since the contrast is optimum at the center of the line. This is illustrated in FIG. 4.

Figure 4A:
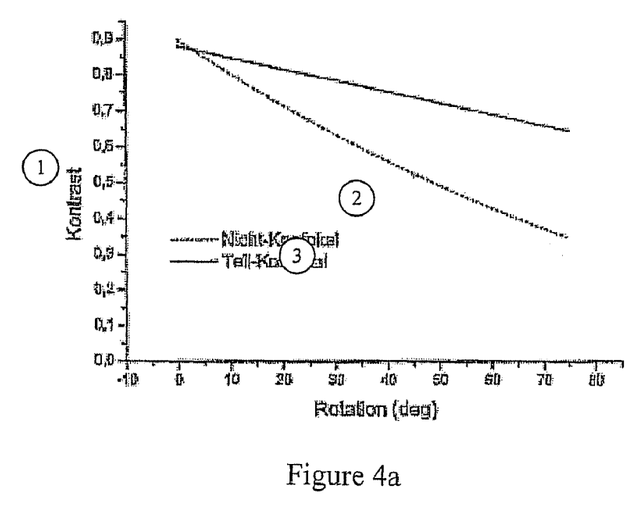

FIG. 4a) shows the contrast in the structured illumination in the specimen plane as a function of the rotation of the grating.

As is generally the case when using structured illumination, when focusing with objective lenses with a high numerical aperture (NA), polarization is an important factor that must be considered here as well. For maximum contrast of the structure, the structure should be oriented perpendicular to the line in an image plane (in FIGS. 1 to 3, in the y-direction). One advantage of the configuration described here is that the polarization need not be rotated for structuring in different spatial directions since the position of the line, in particular relative to the pupil of the objective lens, remains unchanged. Embodiments of the Structure of the Illumination If, during a linear scan by the scanner over time $\Delta t$, the camera synchronously acquires an image with an exposure time of at least $\Delta t$, the result obtained is equivalent to a wide-field image of the specimen. In this case, the out-of-focus background is detected as well. Confocal filtering can be used to advantage if the modulator (5), synchronously with the scanning procedure, periodically switches the illumination on and off in the y-direction as each phase image that is needed to calculate a sectional image is acquired.

One advantage is that even during the switched-off intervals, the scanner, in addition to the continuous scanning motion with on and off switching, can be rapidly moved to the next position with switched-on illumination in which the illuminated scanning step is continued. The scanner could also move in a step-by-step manner, similar to a stepping motor.

A method according to the present invention leads to an exposure in the camera plane, which exposure is structured in the y-direction (see FIG. 5). In one embodiment of the invention, the distances between the exposed lines of the camera are selected in such a manner that cross-talk of the out-of-focus background is minimized during the illumination of a line on the specimen into the region of the camera that corresponds to the illumination of the next line in the specimen. When the specimen is scanned according to the Nyquist theorem (half the width of the point spread function (PSF) apart), empirically an interval of M=5 to 10 lines between neighboring exposure lines should be sufficient. In the next image acquired by the camera, the exposed line pattern (in cases of diffraction-limited imaging onto the camera, the line distribution overlaps approximately two receiver lines) is preferably is shifted by one line, which is implemented by an appropriate delay in switching the modulator on. Thus, for example, first the $1^{st}$, $10^{th}$, $20^{th}$, etc., line and subsequently, the $11^{th}$ and $21^{st}$, etc., line is illuminated.

This procedure is repeated until the specimen in the image field has been completely scanned, so that M times the number of the phase shifts (preferably M times 3) is obtained as a result of this acquisition procedure.

As an alternative, to scan the lines, first the image could be acquired at various phase angles of the periodic structure, and subsequently the scan line pattern could be shifted.

In addition to the method already described above, each of these images can be created by repeatedly acquiring each image, preferably at the lowest possible intensity to spare the specimen, using the same scanner settings and by subsequently taking the mean. This method can reduce artifacts due to bleaching phenomena in the specimen. By blending M times 3 phase images, it is now possible to adjust the confocality.

Specifically, it is necessary to subtract the exposed background between the exposed receiver lines which was detected by the receiver for the individual images. This background can be readily identified on the receiver (regions in which there should actually not be any light).

If all images are simply summed up, a result corresponding to the wide-field image is obtained. Summing up the images after selection of the lines that correspond to the relevant illuminated lines in the focus of the specimen leads to a confocal image. In this step, the (neighboring) image regions which are complementary to the selected lines are, as described, masked and not analyzed. This corresponds to the function of a virtual slit diaphragm, since the unused, masked image regions correspond to the detection sites of the out-of-focus scattered light. The confocality can be varied between 1 Airy unit (2 lines selected) and M Airy units (virtual split diaphragm).

FIG. 5 shows the exposure pattern on the camera for confocal detection with the modulator on and off (AOM).

Compared to nonfocal detection, the speed of image acquisition is decreased by the factor M. Based on an image acquisition of 50 images/sec, at M=5, a complete image can be obtained in 100 msec (at a phase angle of the structure). However, it should be noted that for each structure orientation, N=3 to 5 images with different phase angles must be acquired. Thus, in the case of a linear structure with 3 structure orientations, typically 9 images must be taken [7], which, at M=5, leads to an image acquisition time of approximately 1 sec per plane.

A slightly more favorable situation results if the scanner (9) does not scan the image field uniformly (at speed $v_s$) but moves at a maximum speed $v_{max}$ during the times in which the laser is switched off. Although this makes higher demands on the control and synchronicity of the scanners, it increases the image acquisition time by the factor $$sf = \frac{M}{(M-1)\frac{v_s}{v_{max}} + 1}$$

i.e., approximately M-fold (if $v_{max} \gg v_s$) or up to the maximum image acquisition speed of the camera.

An alternative to sequential scanning with M line patterns which, instead of acquiring M line images, allows the acquisition of a single image and yet makes confocal detection possible, will be discussed below. In this case, it is possible to take advantage of the fact that the line scanner scans the specimen sequentially scanned line by line. This makes it possible to implement a line-by-line deflection of the detection light by an additional element in the detection beam path so that a line pattern as shown in FIG. 5 results on the detector although the specimen is scanned continuously. To be able to image a complete image on the detector in this manner, the prerequisite is that this M must have more lines than are required for the image. A typical value is 500 lines per image. At M=5, this leads to a required detector cell number of 2500. The element to be used to implement the line deflection could be, e.g., a galvanometer scanner upstream of the detector. For example, a scanner (not shown) having the same axis of deflection as scanner (9) which, as described above, is responsible for the deflection in the y-direction, generates, for example, 10 offset discrete scan jumps within a line position of the sequential line scan of the scanner (9) before this scanner advances into the next detected line position. The scanner (9) can also scan continuously while the scanner upstream of the detector must always be operated discretely with a high deflection speed. The time $t_1$ between the scan jumps at a time $t_d$ corresponds to the effective line integration time on the camera. At least $M \cdot t_d < t_1$ must apply.

On the area detector, these scan jumps generate spaced-apart signals of the illuminated specimen which, mutatis mutandis, correspond to the spaced-apart regions of the detector as described in detail above especially in connection with FIG. 5.

If the pixel size on the camera is 5 μm, the maximum angle of deflection is such that in the example mentioned above, an offset of (2500−500)×5 μm=10 mm results on the camera. Assuming a distance of 50 mm between the camera and the scanner, this corresponds to a scan angle of 5 degrees (for a deflection of 10 degrees). For example, this scanner having the same axis of deflection as the scanner (9), which, as described above, is responsible for the deflection in the y-direction, generates, for example, 10 offset discrete scan jumps within a line position of the sequential line scan of the scanner (9) before this scanner advances into the next detected line position. The scanner (9) can also scan continuously while the scanner (24) must always be operated discretely with a high deflection speed. The time $t_1$ between the scan jumps at a time $t_d$ corresponds to the effective line integration time on the camera. At least $M \cdot t_d < t_1$ must apply.

On the area detector, these scan jumps generate spaced-apart signals of the illuminated specimen which, mutatis mutandis, correspond to the spaced-apart regions of the detector as described in detail above especially in connection with FIG. 3.

Figure 6:
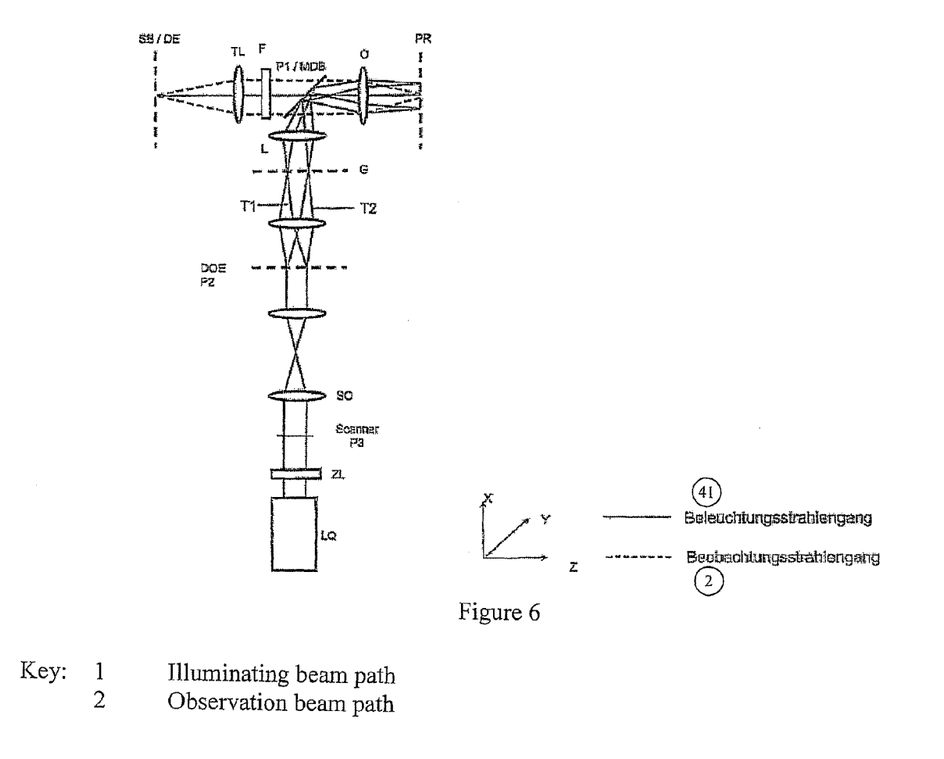
FIG. 6 is a schematic view illustrating yet another embodiment of the present invention.

FIG. 6 shows yet another configuration comprising a light source LQ, a beam shaper (cylinder lens) ZL, a scanner P3, a scanning optics system SO, a structured element G, a lens L, a main dichroic beam splitter MDB in the pupil of the objective lens, the objective lens O, the specimen PR and, on the detection side, the filter F, the lens TL and the detector DE.

Disposed on a plane conjugate to the pupil plane is a diffractive optical element (DOE) for shaping the beam, which element makes the line generated with the cylinder lens ZL conform to the period of the grating G (amplitude grating) so that the illuminating light can pass through the grating and constructive interference occurs at the grating openings. This has the advantage that the 50 percent loss on an amplitude grating, which would otherwise occur, is avoided.

Figure 7:
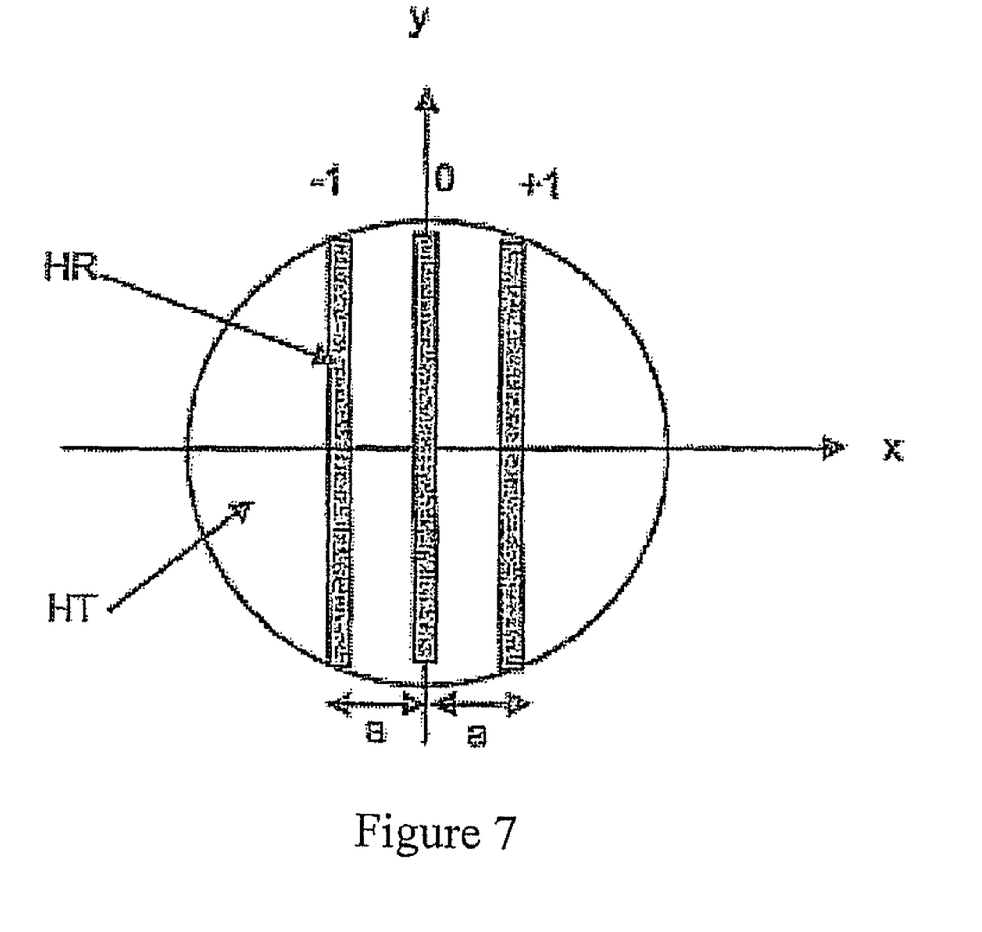
FIG. 7 illustrates the design of a beam splitter used in the present invention.

The beam splitter preferably has the design shown in FIG. 7 and comprises highly reflecting regions HR onto which, by means of L in FIG. 6, the orders of diffraction are imaged and extend into the direction of the specimen PR.

The remaining region of the beam splitter MDB is designed to transmit light so that the specimen light extends in the direction of the detector DE.

Reference is hereby made to the disclosure of DE 10257237 A1.

Figure 8:
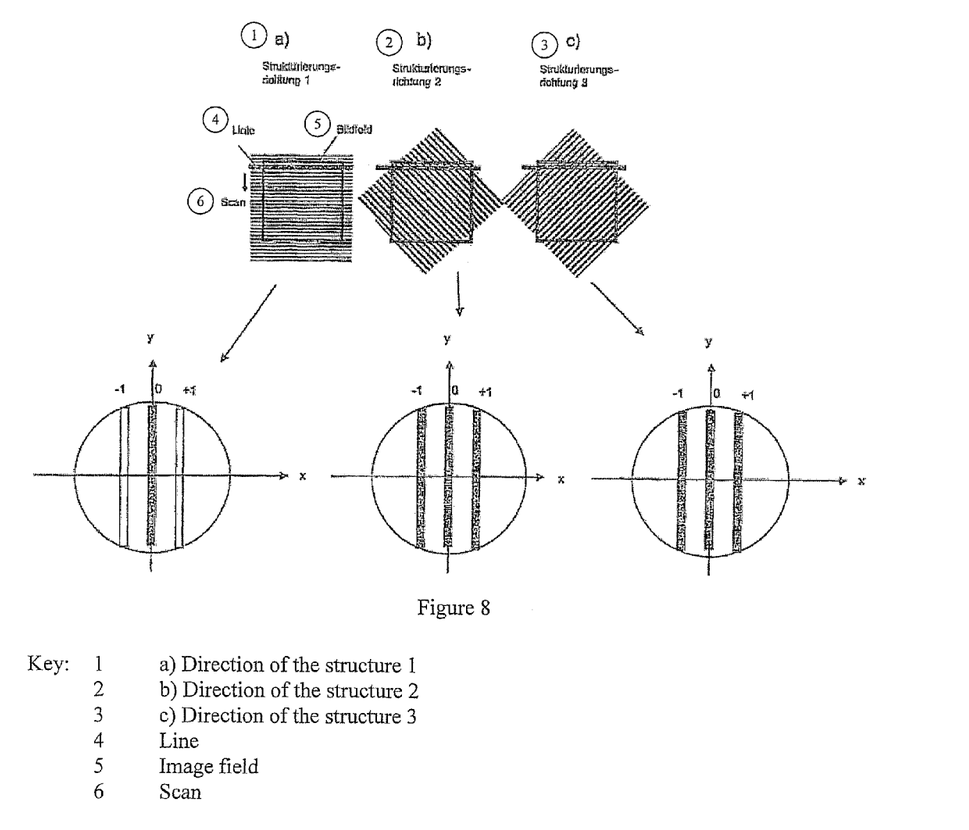

With the direction of the structure being rotated as in FIG. 3 and using the MDB according to FIG. 7, FIG. 8 shows the light distribution in the pupil of the objective lens (plane of the MDB). In FIG. 8a, the structure direction is oriented parallel to the line orientation in the specimen. Therefore, only the $0^{th}$ diffraction order is present, which is seen as a dark line in the conjugate plane of the pupil. When the structure is rotated (for which G and DOE are jointly rotated), the $\pm 1^{st}$ diffraction orders arise, which, given the preferred symmetrical rotation about the position of a), are located in the same area of the pupil and can be reflected by the reflective regions of the MDB.

As an alternative, the structured element G can also be a phase grating. In this case, the structure in the y-direction as shown in FIG. 8 a) must be obtained by switching the illumination synchronously with the scanning motion. In this case, the DOE and the two neighboring lenses are not needed and the element G can be placed directly into the intermediate image generated by the scanning optics system SO.

Figure 9:
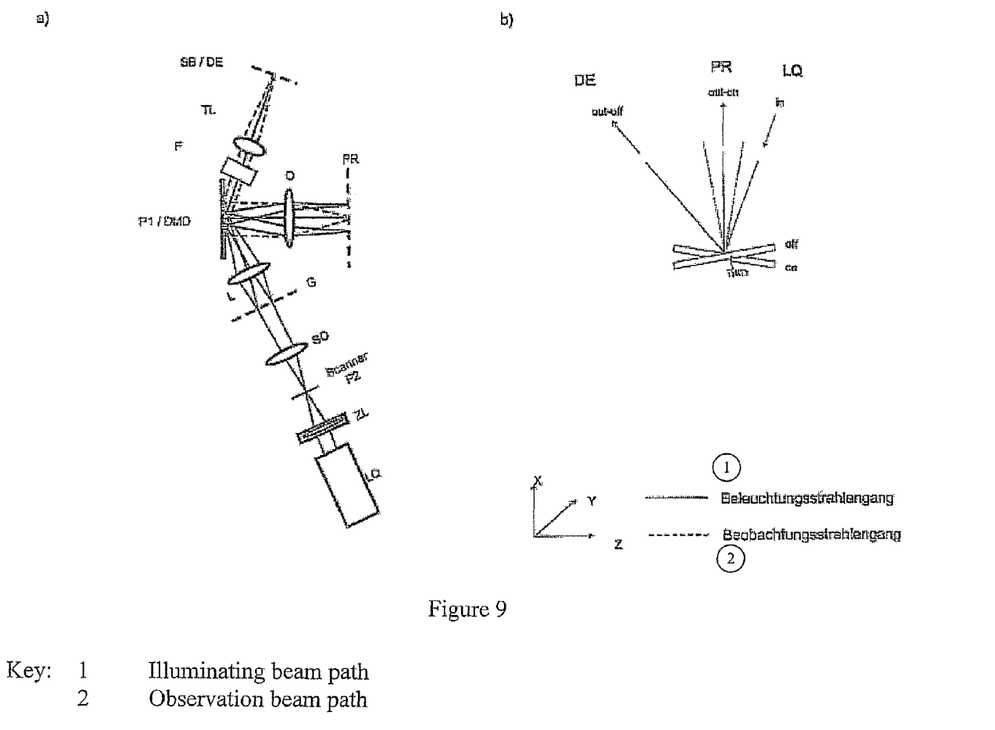
FIG. 9 illustrates yet a further embodiment of the invention.

In FIG. 9, the splitter MDB is a DMD (digital mirror device) which is disposed in the plane of the pupil.

By appropriately switching the micromirrors, any light distributions that emerge as a result of the rotation of the structured element G can be deflected into the direction of the specimen (PR out-on in 8 b) while the specimen light extends into the direction of the detector DE via non-switched mirrors (DE out-off in 8 b)) (if the DMD is optimally positioned relative to the illumination/detection).

The present invention is not to be limited only to the embodiments described herein. Rather, while the invention has been illustrated and described in connection with currently preferred embodiments shown and described herein, persons skilled in the art would understand that various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications thereof as are suited to the particular use contemplated.

For example, the present invention can, mutatis mutandis, be applied to other illumination distributions, such as multipoint configurations (U.S. Pat. No. 6,028,306) and other point configurations, including Nipkow disks, and for detection in a wide field.

The invention claimed is:

1. A microscope arrangement for optical detection of a specimen, comprising scanning means for scanning a specimen or at least part of the specimen by means of linear illumination having illuminating light, means for linear beam shaping of said illuminating light of said linear illumination, said illuminating light having a structure in at least one spatial direction, means for generating said structure being disposed in a beam path of said illuminating light, means for detecting light coming from the specimen, means for generating images of the specimen from said light coming from the specimen, wherein at least one optical sectional image through the specimen and/or one image with increased resolution is calculated from the images, and means for generating said structure in a direction of the illumination are disposed downstream of the scanning means.

2. The arrangement of claim 1, wherein said scanning means is disposed between the means for beam shaping and means for structuring.

3. The arrangement of claim 1, said structure having a plurality of phase angles, and further comprising means for rotating said structure and for changing said phase angle of said plurality of phase angles.

4. The arrangement of claim 1, wherein the means for generating said structure is provided in an intermediate image between the scanning means and an object.

5. The arrangement of claim 1, wherein the means for generating said structure is designed so as to be transmitting or reflecting.

6. The arrangement of claim 1, wherein the means for generating said structure are amplitude or phase gratings or an interference distribution.

7. The arrangement of claim 4, wherein a diffraction image generated by the means for generating the structure is imaged in or near the region of the pupil of an objective lens of said arrangement and a beam splitter with highly reflecting areas is located in that region, which beam splitter reflects the diffraction image in a direction of the specimen and is otherwise designed for transmission so as to be able transmit the light coming from the specimen in a direction of the detection.

8. The arrangement of claim 7, wherein said beam splitter is a switchable mirror array, wherein, by switching first micromirrors, the diffraction image is transmitted in the direction of the specimen and reflected by specimen light via second micromirrors in the direction of the detection.

9. The arrangement of claim 1, wherein polarization of the illuminating light takes place synchronously with rotation of the periodic structure.

10. The arrangement of claim 1, further comprising an area detector or a camera for non-descanned detection of the specimen light, and means for interrupting the light during the scanning procedure so as to generate a spatial interval between illuminated specimen regions and/or to generate spatial intervals on the area detector between lines exposed to detection light from an illuminated specimen region, and a detection beam path along which light travels to said detector or camera.

11. The arrangement of claim 10, wherein intensity control means is disposed in the illuminating beam path.

12. The arrangement of claim 10, wherein an electro- or acousto-optical modulator for light interruption is provided.

13. The arrangement of claim 10, further comprising a scanner disposed in the detection beam path so as to expand the specimen light discretely line by line on the detector or continuously on the detector during the line-by-line scanning procedure.

14. A method for optically detecting a specimen, comprising scanning a specimen or at least a part of the specimen by means of linear illumination by a scanning means, linear beam shaping of illuminating light of said linear illumination, generating structure of the illuminating light after said light has passed the scanning means, said illuminating light having a structure in at least one spatial direction, detecting light coming from the specimen, generating images of the specimen from said light coming from the specimen, calculating at least one optical sectional image through the specimen, and calculating at least one image with increased resolution from the images.

15. The method of claim 14, wherein first a beam of said linear illumination is shaped, then passes through the scanning means and is subsequently structured.

16. The method of claim 14, wherein the structure has a phase angle and is rotated so that the phase angle is changed.

17. The method of claim 14, wherein the structure is generated by means of transmitting or reflecting means.

18. The method of claim 14, wherein a diffraction image generated by the means for generating the structure is imaged in or near the region of the pupil of an objective lens of said arrangement and a beam splitter with highly reflecting regions is located in that region, which beam splitter reflects the diffraction image in a direction of the specimen and is otherwise designed for transmission so as to be able to transmit the light coming from the specimen in a direction of the detection.

19. The method of claim 14, wherein the beam splitter is a DMD and the diffraction image is transmitted in the direction of the specimen by switching the first micromirrors and the specimen light is reflected in the direction of detection via the second micromirrors.

20. The method of claim 14, wherein the polarization of the illuminating light takes place synchronously with rotation of the periodic structure.

21. The method of claim 14, wherein spatial intervals are generated on an area detector or on a camera for line-by-line non-descanned detection between lines illuminated with detection light from the illuminated specimen region.

22. The method of claim 14, wherein the illumination is repeatedly switched on and off during the line-by-line illumination and detection.

23. The method of claim 14, wherein the light during the specimen scan is repeatedly interrupted in such a manner that a spatial interval forms between two illuminated parts of the specimen.

24. The method of claim 14 for confocal image generation, wherein an image is calculated by means of partially or completely masking spatial intervals between camera regions associated with the illuminated specimen regions and the images thus obtained are blended.

25. The method of claim 24, wherein the images are blended in such a manner that neighboring scanned regions of the specimen are properly scaled and adjacently aligned in blended image.

26. The method of claim 14, wherein, during a scanning procedure, light is further deflected upstream of the detector through the line in a direction of the scan of the specimen.

27. The method of claim 14, wherein the speed of the light deflection is greater than the speed of the relative movement between the specimen and the illuminating light.

28. The method of claim 14, wherein the light is deflected step by step.

29. The method of claim 14, wherein the light is deflected continuously.

30. The method of claim 14 for use in a laser scanning microscope.

31. A laser scanning microscope according to the arrangement of claim 1.

32. The arrangement of claim 8 wherein said switchable mirror array is a DMD.

33. The arrangement of claim 1 wherein said structure of said illuminating light having a structure is a periodic structure.

34. The method of claim 14 wherein said structure of said illuminating light having a structure is a periodic structure.

* * * * *